June 4, 1957 B. FOX 2,794,956

FREQUENCY MODULATION SYSTEM

Original Filed June 30, 1942

INVENTOR.

Benjamin Fox 2,794,956
Patented June 4, 1957

2,794,956

FREQUENCY MODULATION SYSTEM

Benjamin Fox, Red Bank, N. J.

Original application June 30, 1942, Serial No. 449,121. Divided and this application August 14, 1946, Serial No. 690,430

6 Claims. (Cl. 332—19)

(Granted under Title 35, U. S. Code (1952), sec. 266)

The invention described herein may be manufactured and used by or for the Government for governmental purposes, without the payment to me of any royalty thereon.

This application is a division of my application entitled "Electric Signalling," Serial Number 449,121, filed June 30, 1942.

My present invention relates generally to timing modulation and/or control.

A principal object of my invention is to provide novel means and methods of producing timing modulated waves.

Another object of my invention is to stabilize the mean (or average) timing of a timing modulated wave.

Another object of my invention is to provide improved methods and apparatus for producing wide-band frequency modulation of oscillation generators.

Another object of my invention is to provide improved means and methods for stabilizing the frequency of oscillation generators.

Another object of my invention is to provide improved means and methods for stabilizing the mean frequency (also termed the center frequency or average frequency) of a frequency-modulated wave.

Figure 1:
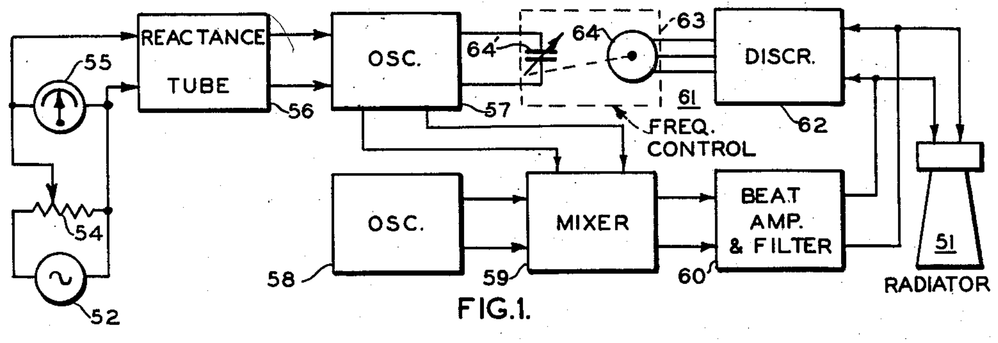
Figure 2:
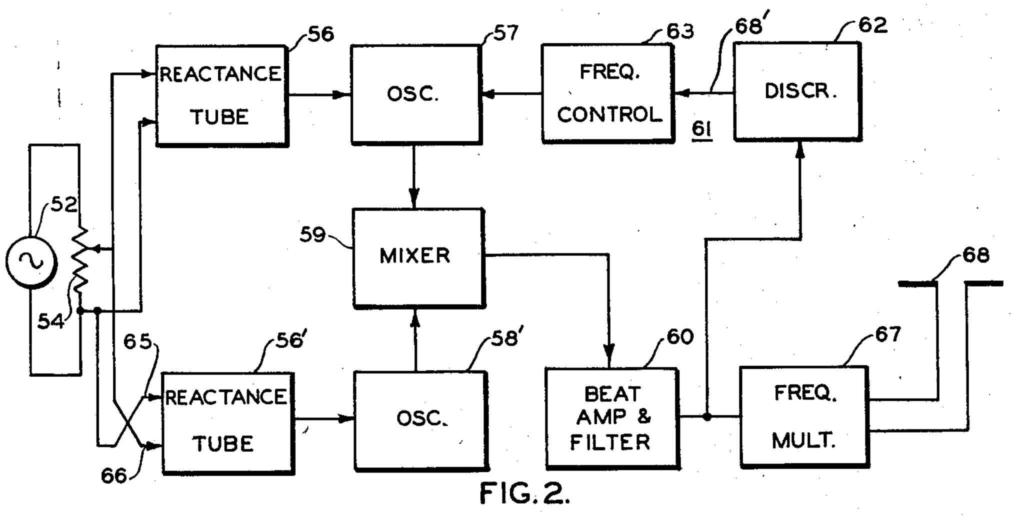

For an understanding of the invention, together with other and further objects thereof, reference is had to the following description taken in connection with the accompanying drawing wherein similarly operating components in the various figures are indicated by like reference numerals, and wherein Figures 1 and 2 are block diagrams of two embodiments of my invention.

Reference is now made particularly to Figure 1, which shows a system particularly suited for generating frequency modulated carriers of relatively low mean frequency, such as may be used in acoustic signalling. The system includes two oscillators 57 and 58, respectively tuned to different frequencies, and having their outputs applied to a mixer 59. The mixer heterodynes the two oscillator frequencies, and the difference-beat frequency in the mixer output is filtered and amplified at 60, the output of which constitutes a signal carrier. The carrier is applied to a radiator 51 which, in this case, is a sound transducer, the output of which can be transmitted in air or water.

Oscillator 57 is frequency modulated by a reactance tube network 56, which is in turn driven by the voltage across a potentiometer 54, shunted across a source of modulation signal potential 52. A meter 55 may be used to indicate the modulation potential applied to the reactance tube.

In operation, the oscillator 57 has its frequency F deviated by the reactance tube over a range of $\pm\Delta F$. The frequency $F\pm\Delta F$ is then heterodyned in mixer 59 with the output of fixed oscillator 58, which is preferably crystal controlled and tuned to a frequency F′, which may be lower or higher than F. The difference-beat frequency $F-F'\pm\Delta F$ is then filtered and amplified at 60 and used as a carrier which is then radiated by acoustic wave radiator 51. The radiated wave is therefore a frequency-modulated acoustic wave which can be used in frequency modulation altimeter or depth-sounding systems, or for signalling in air or water.

The carrier output of filter 60 may also be fed, as shown, to a conventional automatic frequency control (A. F. C.) circuit 61 which, in response to slow variations in the mean frequency of the carrier, functions to maintain said mean frequency constant. This A. F. C. circuit includes a discriminator 62 and a frequency control unit 63. Discriminator 62, in a manner well known in the art, will develop control energy in response to slow deviations of the carrier from the desired mean frequency. The magnitude of this control energy is proportional to said deviation, and the polarity or phase characteristic of this energy is dependent upon the direction of said deviation. This control energy is then applied to a reversible motor 64 of the frequency control unit 63, which motor in turn rotates a variable trimmer condenser 64′ which is part of the resonant tank circuit of oscillator 57. Thus, slow variations in the mean frequency of the carrier will cause condenser 64′ to be rotated to vary the mean frequency of oscillator 57 in such direction that the mean carrier frequency will be brought back to the desired value. For more detailed descriptions of suitable forms of reactance tube network 56 and A. F. C. circuit 61, reference is made to Morrison Patent 2,250,104, issued July 22, 1941.

The advantages of the above described system will be obvious from the following considerations: for example, suppose it is desired to generate a carrier frequency of 70 kilocycles, and frequency modulate it over a range of ±6 kilocycles. If a 70 kilocycle oscillator were directly modulated over this range, so much reactance variation would have to be provided in the tank circuit of said oscillator that it would be practically impossible to use ordinary reactance tube methods. With the present invention, the desired carrier is obtained by beating together two high frequency oscillators, one of which can be easily modulated by ordinary reactance tube methods. For instance, oscillator 57 may be tuned to a mean frequency of 1570 kilocycles, which may be easily deviated over a range of ±6 kilocycles, since this represents a frequency deviation of less than ½% of the mean frequency. Then, by tuning oscillator 58 to a frequency of 1500 kilocycles, the desired mean carrier frequency of 70 kilocycles may be obtained.

The above described method of wide-band frequency modulation of relatively low frequency carriers may also be used for frequency-modulated carrier telephony such as described in the May 1942 issue of "Electronics," page 57. In such case, the modulation signal source 52 will be a microphone, and the output of amplifier 60 will be transmitted over a transmission line, such as a telephone line or a power distribution network. A predistorting network can also be inserted between the microphone and the reactance tube to emphasize the higher modulation frequency, with resultant gain in signal-to-noise ratio.

A modification of the above circuit is shown in Figure 2, wherein oscillator 58′ is not fixed, as is oscillator 58 in Figure 1, but is frequency modulated in synchronism with oscillator 57, but in the opposite direction. This is done by means of an additional reactance tube network 56′, similar to 56. The modulation potential from source 52 is supplied to reactance tube 56′ in reverse phase, as symbolically indicated by reversed connections 65 and 66. The resultant frequency-deviation band-width of the carrier output of filter 60, for a given modulation voltage, will be twice as wide as that in Figure 1, if both oscillators 57 and 58′ are modulated over equal band-widths. However, both oscillators need not be modulated over the same band-width. Obviously the carrier frequency deviation will always be equal to the sum of the frequency deviations of both oscillators.

The opposed-phase modulation of the reactance tubes 56 and 56' provide the additional advantage of substantially eliminating the effects of any asymmetrical or non-linear modulation characteristic that may exert in said tubes.

The carrier output of amplifier 60 may be applied directly to a sound transducer, such as 51 in Figure 1, or it may be multiplied in a frequency multiplier 67 and radiated from an antenna 68 for purposes of radio signalling, radio control, distance measurement, etc.

In other respects, the features of Figure 1 are equally applicable to Figure 2, similarly numbered components in both figures indicating similarly operating components. Thus, in Figure 2, the beat frequency output may also be applied to an A. F. C. circuit 61.

While there have been described what are at present considered preferred embodiments of the invention, it will be obvious to those skilled in the art that various changes and modifications may be made therein without departing from the invention; and it is aimed in the appended claims to cover all such changes and modifications as fall within the true spirit and scope of the invention.

I claim:

1. A frequency modulation transmitter, comprising a source of high frequency waves subject to slow variations in mean frequency, means for frequency modulating said waves in accordance with a signal, another source of high frequency waves, means for heterodyning the outputs of said sources to produce a carrier, and means responsive to slow variations of the mean frequency of the carrier from a predetermined value for changing the frequency of said other source to reduce said deviations.

2. A frequency modulation transmitter as set forth in claim 1, wherein said means frequency-modulates both wave sources in opposite directions.

3. A frequency modulation transmitter as set forth in claim 1, wherein said means frequency-modulates both sources equal extents in opposite directions.

4. A frequency modulation system comprising a source of high frequency waves, means for frequency-modulating said waves in accordance with a signal, a second source of high frequency waves, means for heterodyning the outputs of said sources to produce a resultant wave to be utilized, a frequency responsive circuit energized by said resultant wave, and means controlled by said frequency responsive circuit to charge the frequency of said other source.

5. In transmitting apparatus for communication systems, the combination comprising a pair of oscillators preselected to oscillate at different high frequencies, a mixing circuit including a non-linear device for obtaining the beat frequency equal to the difference between said high frequencies, modulating means for each of said oscillators including a reactance tube and a source of audio frequency energy for frequency modulating said high frequencies, and an output means coupled to said mixing means and broadly tuned to said beat frequency for transmitting the frequency modulated beat frequency energy.

6. In transmitting apparatus for communication systems, the combination comprising a first oscillator operating at a first preselected high frequency, a second oscillator operating at a second preselected high frequency, each of said oscillators having a predetermined frequency deviation above and below said preselected high frequencies, mixing means including a non-linear device for obtaining the beat frequencies equal to the sum and difference of said first and second high frequencies, output means coupled to said mixing means and broadly tuned to the beat frequency equal to the difference between said high frequencies, modulating means for each of said oscillators including a reactance tube, and means including a source of audio frequency energy for oppositely varying the reactance of said reactance tubes, whereby the frequencies of said oscillators are oppositely varied within said predetermined frequency variation to thereby produce frequency modulation of said beat frequencies.

References Cited in the file of this patent

UNITED STATES PATENTS

| | | |
|---|---|---|
| 1,629,685 | Ditcham | May 24, 1927 |
| 2,018,820 | Usselman | Oct. 29, 1935 |
| 2,250,104 | Morrison | July 22, 1941 |
| 2,279,659 | Crosby | Apr. 14, 1942 |
| 2,322,588 | Peterson | June 22, 1943 |
| 2,335,934 | Goldstine | Dec. 7, 1943 |
| 2,394,393 | Mayer | Feb. 5, 1946 |
| 2,475,779 | Crosby | July 14, 1949 |